United States Patent
Tullman

(10) Patent No.: US 11,366,473 B2
(45) Date of Patent: Jun. 21, 2022

(54) SYSTEMS AND METHODS FOR AUTONOMOUS MARKING IDENTIFICATION

(71) Applicant: USIC, LLC, Indianapolis, IN (US)

(72) Inventor: Robert Tullman, Indianapolis, IN (US)

(73) Assignee: USIC, LLC, Indianapolis, IN (US)

( * ) Notice: Subject to any disclaimer, the term of this patent is extended or adjusted under 35 U.S.C. 154(b) by 0 days.

(21) Appl. No.: 16/674,779

(22) Filed: Nov. 5, 2019

(65) Prior Publication Data

US 2020/0145789 A1 May 7, 2020

Related U.S. Application Data

(60) Provisional application No. 62/755,887, filed on Nov. 5, 2018, provisional application No. 62/275,883, filed
(Continued)

(51) Int. Cl.
*H04W 4/02* (2018.01)
*G05D 1/00* (2006.01)
(Continued)

(52) U.S. Cl.
CPC ......... *G05D 1/0094* (2013.01); *B64C 39/024* (2013.01); *B64D 1/18* (2013.01);
(Continued)

(58) Field of Classification Search
CPC .............. B64C 39/024; B64C 2201/12; B64C 2201/123; B64C 2201/141;
(Continued)

(56) References Cited

U.S. PATENT DOCUMENTS 5,883,815 A 3/1999 Drakulich et al.
7,739,899 B1 6/2010 Holland et al.
(Continued)

FOREIGN PATENT DOCUMENTS

DE 102015008086 A1 12/2016
DE 102015008086 B4 5/2018
(Continued)

OTHER PUBLICATIONS

International Search Report dated Jan. 16, 2020, Application No. PCT/US2019/059863 (19 pages).
(Continued)

*Primary Examiner* — Khawar Iqbal
(74) *Attorney, Agent, or Firm* — Burns & Levinson LLP; Christopher Carroll

(57) ABSTRACT

A marking identification system comprising a marking database, a drone, and a data network communicatively coupled to the marking database and drone. The marking database is arranged to store marking data associated with one or more markings. The marking data can include one or more marking locations within a geographic area and a type of infrastructure associated with each of the one or more marking. The drone is arranged to determine the location of the drone via one or more location sensors, receive data from the marking database, and deploy to the location within the geographic area. The drone is also arranged to detect one or more markings within the geographic area, detect an indicator in pain associated with each of the detected markings, and determine a type of infrastructure associated with each of the detected markings based on the detected indicator associated with each of the markings.

22 Claims, 9 Drawing Sheets

Related U.S. Application Data on Nov. 5, 2018, provisional application No. 62/755,876, filed on Nov. 5, 2018.

(51) Int. Cl.

| | |
|---|---|
| *G05D 1/02* | (2020.01) |
| *G05D 1/10* | (2006.01) |
| *B64C 39/02* | (2006.01) |
| *B64D 47/08* | (2006.01) |
| *B64D 9/00* | (2006.01) |
| *B64D 1/18* | (2006.01) |
| *H04W 4/40* | (2018.01) |
| *G01V 15/00* | (2006.01) |
| *H04W 4/38* | (2018.01) |
| *H04W 4/029* | (2018.01) |
| *G06F 16/28* | (2019.01) |
| *G06F 16/29* | (2019.01) |
| *G08G 5/00* | (2006.01) |
| *G06V 20/13* | (2022.01) |
| *H04W 84/18* | (2009.01) |

(52) U.S. Cl.
CPC .............. *B64D 9/00* (2013.01); *B64D 47/08* (2013.01); *G01V 15/00* (2013.01); *G05D 1/0088* (2013.01); *G05D 1/0276* (2013.01); *G05D 1/101* (2013.01); *G06F 16/285* (2019.01); *G06F 16/29* (2019.01); *G06V 20/13* (2022.01); *G08G 5/0069* (2013.01); *H04W 4/029* (2018.02); *H04W 4/38* (2018.02); *H04W 4/40* (2018.02); *B64C 2201/027* (2013.01); *B64C 2201/12* (2013.01); *B64C 2201/123* (2013.01); *B64C 2201/127* (2013.01); *B64C 2201/141* (2013.01); *B64C 2201/145* (2013.01); *B64C 2201/146* (2013.01); *H04W 84/18* (2013.01)

(58) Field of Classification Search
CPC ....... B64C 2201/146; B64C 2201/145; H04W 4/029; H04W 4/38; G06F 16/285; G06F 16/29; G08G 5/0069; G01N 21/8803
See application file for complete search history.

(56) References Cited

U.S. PATENT DOCUMENTS

| | | | |
|---|---|---|---|
| 9,542,863 B2 | 1/2017 | Nielsen et al. | |
| 9,702,830 B1 | 7/2017 | Akselrod et al. | |
| 10,831,199 B2* | 11/2020 | Anderson | G05D 1/0027 |
| 10,841,744 B2 | 11/2020 | Patil et al. | |
| 10,866,597 B1 | 12/2020 | Reinhold et al. | |
| 11,059,582 B2 | 7/2021 | Nahuel-Andrejuk et al. | |
| 11,125,910 B2 | 9/2021 | Starr et al. | |
| 11,265,538 B2 | 3/2022 | Esenlik et al. | |
| 2007/0042123 A1 | 2/2007 | Endregaard et al. | |
| 2008/0218170 A1 | 9/2008 | Stolarczyk et al. | |
| 2009/0040093 A1 | 2/2009 | Holly et al. | |
| 2009/0167308 A1 | 7/2009 | Lomes | |
| 2010/0019464 A1 | 8/2010 | Miller | |
| 2011/0063767 A1 | 3/2011 | Kaszienny et al. | |
| 2012/0210853 A1 | 8/2012 | Abershitz et al. | |
| 2012/0229321 A1 | 9/2012 | Holly et al. | |
| 2013/0265138 A1 | 10/2013 | Nielsen et al. | |
| 2014/0297225 A1 | 10/2014 | Petroski et al. | |
| 2015/0330911 A1 | 11/2015 | Howard | |
| 2016/0350907 A1 | 12/2016 | Simula et al. | |
| 2017/0031369 A1* | 2/2017 | Liu | G06K 7/1417 |
| 2017/0102467 A1* | 4/2017 | Nielsen | G01S 19/47 |
| 2017/0108609 A1* | 4/2017 | Haddy | G01V 3/08 |
| 2017/0323129 A1* | 11/2017 | Davidson | G05D 1/0234 |
| 2017/0363764 A1 | 12/2017 | Aldridge et al. | |
| 2018/0156614 A1* | 6/2018 | Michini | G05D 1/0011 |
| 2018/0196135 A1 | 7/2018 | Crain et al. | |
| 2018/0259652 A1* | 9/2018 | Shimizu | G01C 15/04 |
| 2018/0306923 A1 | 10/2018 | Porcel Magnusson | |
| 2019/0087635 A1* | 3/2019 | Klaus | G06T 7/593 |
| 2019/0187724 A1* | 6/2019 | Li | B64F 1/007 |
| 2019/0259150 A1 | 8/2019 | High et al. | |
| 2019/0317239 A1* | 10/2019 | Olsson | G01C 21/32 |
| 2019/0354742 A1* | 11/2019 | Murakoshi | G06T 7/90 |
| 2020/0012829 A1 | 1/2020 | Davidson et al. | |
| 2020/0065605 A1* | 2/2020 | Manako | G01C 7/04 |
| 2020/0066142 A1* | 2/2020 | Fowe | G06K 9/00651 |
| 2020/0072624 A1 | 3/2020 | Kuzmanovic | |
| 2020/0111222 A1* | 4/2020 | Asmari | G06T 7/593 |
| 2020/0115050 A1* | 4/2020 | Murakoshi | B64D 47/08 |
| 2020/0158910 A1* | 5/2020 | Tietsworth | G01R 29/085 |
| 2021/0013705 A1 | 1/2021 | Miron et al. | |
| 2021/0061465 A1* | 3/2021 | Kaneda | G06T 7/50 |
| 2021/0231518 A1 | 7/2021 | Pawlyk | |
| 2021/0278314 A1 | 9/2021 | Xia et al. | |
| 2021/0284335 A1 | 9/2021 | McLaughlin et al. | |
| 2021/0309352 A1 | 10/2021 | Elkins | |
| 2021/0391653 A1 | 12/2021 | Berg | |
| 2021/0405244 A1 | 12/2021 | Starr et al. | |

FOREIGN PATENT DOCUMENTS

| | | |
|---|---|---|
| DE | 102018121401 A1 | 3/2020 |
| EP | 2805229 B1 | 5/2020 |

OTHER PUBLICATIONS

International Search Report dated Jan. 21, 2020, Application No. PCT/US2019/059858 (19 pages).

International Search Report dated Jan. 21, 2020, Application No. PCT/US2019/059862 (20 pages).

Machine Translation of Korean Patent Application Pub. No.: KR101786494B1 that was filed in 2017.

* cited by examiner

| Marking Type | Location | Project | ID | Status |
|---|---|---|---|---|
| Gas | L1 | P1 | GØØ1 | Ok |
|  | L2 | P1 |  | Ok |
|  | L3 | P1 |  | M |
|  | L4 | P1 |  | F |
| Potable Water | L1 | P1 | PØØ1 | Ok |
|  | L2 | P1 |  | Ok |
| Sewer | L1 | P2 | SØØ1 | M |
|  | L2 | P2 |  | M |
| Communications | L1 | P3 | CØØ1 | Ok |
|  | L2 | P3 |  | Ok |
| Gas | L1 | P4 | GØØ2 | F |

FIG. 5

SYSTEMS AND METHODS FOR AUTONOMOUS MARKING IDENTIFICATION

REFERENCE TO RELATED APPLICATIONS

This application claims priority to and the benefit of: U.S. Provisional Patent Application No. 62/755,876, filed on Nov. 5, 2018, and entitled "Systems and Methods for an Autonomous Marking Apparatus"; U.S. Provisional Patent Application No. 62/755,883, filed on Nov. 5, 2018, and entitled "Systems and Methods for Autonomous Marking Maintenance"; and U.S. Provisional Patent Application No. 62/755,887, filed on Nov. 5, 2018, and entitled "Systems and Methods for Autonomous Marking Identification." The entire contents of the above-referenced applications are incorporated herein by reference.

FIELD OF THE INVENTION

The invention relates generally to systems and methods for operating an autonomous apparatus. More particularly, in various aspects, the invention relates to locating and marking locations associated with underground infrastructure using an autonomous apparatus.

BACKGROUND

Often, public utility lines are run underground due to their function, to limit obstruction of other infrastructure, or for convenience. Examples of underground utility lines include electric power, natural gas, communications, potable water, reclaimed water, and wastewater, among others. As required by law and assigned by the U.S. Federal Communications Commission (FCC), the 8-1-1 telephone number is used as a hotline that allows developers and homeowners to contact utility companies, who will then denote where underground utilities are located using color-coded markings.

Typically, utility companies deploy contractors to detect and identify the location and depth of the utility lines using a utility locator tool. After detection and identification, the utility lines are marked with paint. Such a process is considered labor-intensive and inefficient, often requiring extensive amounts of man-hours of work. Accordingly, there is a need to enable more efficient utility detection and markings. Furthermore, the problem is exacerbated when utility lines need to be marked across a large area (e.g., along a highway) where traditional human marking of the utility lines can be onerous. Hence, there is a long felt need to address the challenges of marking utility lines across a vast area in a more efficient manner. Another problem with utility markings is that such markings may be obscured, covered, or removed during a construction project, requiring contractors to perform multiple surveys of an area that often leads to costly re-identification and re-marking of utility lines. Accordingly, there is also a need enable more efficient and reliable tracking, monitoring, and re-marking of utility lines.

SUMMARY OF INVENTION

The present disclosure describes systems, methods, and devices that enable more efficient identification and marking of certain infrastructure, including underground utilities. In certain aspects, an aerial drone or robot may be deployed within a geographic area or worksite to scan and detect the markings associated with underground infrastructure. The drone may operate autonomously, under the control of a user, or cooperatively with a contractor as the contractor detects and marks the location of certain underground infrastructure. In some aspects, the drone may include detection equipment that enables the drone to autonomously detect certain underground infrastructure. The detection equipment include a depth sensor (e.g., a sonar and/or electromagnetic detector) configured to determine the depth of underground infrastructure. The drone may include a payload of marking material and a delivery mechanism to deliver markings to a surface. The delivery mechanism may include a spray head arranged to deliver a marking material such as paint to a surface at a location corresponding to an infrastructure component. The drone may include a computer processor and navigation system that enables the drone to move to a location or set of locations corresponding to underground infrastructure and/or markings. The drone may include one or more marking sensors that enable the drone to sense and/or detect the present of one or more markings within the vicinity of the drone. The drone may include a communications system that enables the drone to exchange data, including marking identification and/or location data with a remotely located server and/or marking database. The drone may utilize marking location data stored within the marking database to enable the drone to navigate to one or more marking locations within a worksite or geographic area. The drone may be configured to recognize marking at one or more locations and transmit such marking identification and/or location data to the markings database. A drone may be configured to store a portion of the marking databased within its memory and/or local data store.

In one aspect, the present disclosure relates to a marking identification system including a marking database, a drone, and a data network communicatively coupled to the marking database and drone. The marking database is arranged to store marking data associated with one or more markings. The marking data includes one or more marking locations within a geographic area and a type of infrastructure associated with each of the one or more marking. The drone may be arranged to determine the location of the drone via one or more location sensors and receive first data from the marking database. The first data includes a location associated with the geographic area. The drone may also be arranged to deploy to the location associated within the geographic area, detect one or more markings within the geographic area using one or more marker sensors, and detect an indicator in paint associated with each of the detected markings. The drone may also be arranged to determine a type of infrastructure associated with each of the detected markings based on the detected indicator associated with each of the markings and transmit second data to the marking database. The second data includes the type of infrastructure associated with each of the detected markings and a marking location associated with each of the detected markings. The drone may include a processor arranged to control the delivery of a payload at a location of underground infrastructure based, in part, on the apparatus location data and the underground infrastructure data. For example, the processor and/or controller may continuously compare the location of the drone and/or marking apparatus with the location of an underground infrastructure element designated for marking or checking in the underground infrastructure data while the marking apparatus is moving. The processor may continuously compare the difference in, for example, GPS coordinates of the marking apparatus with the target underground infrastructure GPS coordinates, and control the propulsion system so as to navigate the marking apparatus to the GPS coordinates of the underground infrastructure designated for marking. Once at the target location, the marking apparatus may mark the surface above the underground infrastructure designated for marking based on the type of underground infrastructure.

In some implementations, the drone includes a data store that stores a portion of the marking database. In certain implementations, the marking database is located remotely from the drone and the drone receives first data from and sends second data to the marking database via a remote server. In some implementations, the drone sends data to the marking database at least one of periodically, in real-time, in near real-time, and in response to a query from the remote server. The indicator may include a pigment, a radioactive material, light sensitive material, and/or a chemically reactive material.

In other implementations, the drone includes a data store configured to store an infrastructure table correlating each unique signature with a type of infrastructure. In some implementations, the marking database includes an infrastructure table correlating each reference indicator with a type of infrastructure. The drone may be configured to determine the type of infrastructure associated with a detected marking by comparing the detected indicator with the infrastructure table to identify a match between a unique signature and the detected indicator.

The drone may be unmanned aerial vehicle (UAV) or autonomous aerial vehicle (AAV). The marking database may be located in the drone, at a drone-deploying vehicle, in a remote regional location, and/or at a headquarters location. In some implementations, the drone performs detection of the one or more markings in response to an instruction from a user. The instruction from a user may be via a wireless device communicatively coupled to the data network. The drone may be configured to remain within proximity of the user.

The marking data may include data derived from at least one of historical infrastructure information, historical infrastructure maps, regulatory databases, utility databases, previously detected infrastructure, survey data, and real-time detection information. The data network may include a mobile telephone network, a Wi-Fi network, local area network, wide area network, the Internet, a Bluetooth network, and/or other wireless network. In some configurations, the one or more marking sensors include one or more of optical sensors, visible light sensors, cameras, infrared sensors, ultra violet sensors, and radiation sensors.

In another aspect, an autonomous marking identification apparatus includes a transceiver communicatively coupled to a data network. The transceiver is arranged to receive first data from a marking database, where the first data includes marking data associated with a portion of a geographic area. The marking database is arranged to store marking data associated with one or more markings, where the marking data includes one or more marking locations within the geographic area and includes a type of infrastructure associated with each of the one or more marking. The apparatus also includes a location sensor arranged to determine a location of the apparatus and a propulsion system arranged to enable the apparatus to deploy to each marking location within the portion of the geographic area. The apparatus further includes one or more marking sensors arranged to scan an area in proximity to the apparatus. The apparatus also includes a processor arranged to i) coordinate with the one or more marking sensors to detect one or more markings within the geographic area; ii) detect an indicator in paint associated with each of the detected markings; iii) determine a type of infrastructure associated with each of the detected markings based on the detected indicator associated with each of the marking; and iv) coordinate with the transceiver to transmit second data to the marking database, where the second data includes the type of infrastructure associated with each of the detected markings and a marking location associated with each of the detected markings.

In another aspect, a method of identifying markings includes providing a marking database arranged to store marking data associated with one or more markings, where the marking data includes one or more marking locations within a geographic area and includes a type of infrastructure associated with each of the one or more marking. The method also includes: communicatively coupling a marking database to a data network; communicatively coupling a drone to the data network; determining a location of the drone via one or more location sensors; receiving first data from the marking database, where the first data includes marking data associated with a portion of the geographic area; deploying the drone to each marking location within the portion of the geographic area; detecting one or more markings within the geographic area using one or more marker sensors; detecting an indicator in paint associated with each of the detected markings; determining, by the drone, a type of infrastructure associated with each of the detected markings based on the detected indicator associated with each of the marking; and transmitting, from the drone, second data to the marking database, where the second data includes the type of infrastructure associated with each of the detected markings and a marking location associated with each of the detected markings.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which:

FIG. 5 includes a table correlating markings with corresponding location data and project data;

DETAILED DESCRIPTION

The systems, methods, and devices described herein provide an autonomous marking system for the identification and application of utility markings within a geographic area. The autonomous marking system includes a location sensor, a payload assembly, one or more marking sensors, a transceiver, a data store, and a processor. The location sensor is used to determine the location of the apparatus. The payload assembly is used to carry a payload of marking material. For example, the payload assembly can carry a container of paint for marking the utility lines. The one or more marking sensors are used to scan an area in proximity to the apparatus so that the apparatus can identify the utility markings. For example, one of the marking sensors can be an optical sensor that can identify paint and paint colors. The transceiver is used to exchange data with a remote server via a data network. The data store is used to store a portion of the data. The processor receives data from all of the sensors (e.g., the location sensor, the one or more marking sensors, and from the transceiver) and uses the data to control the delivery of the payload (e.g., paint) at the location of the apparatus.

Figure 1:
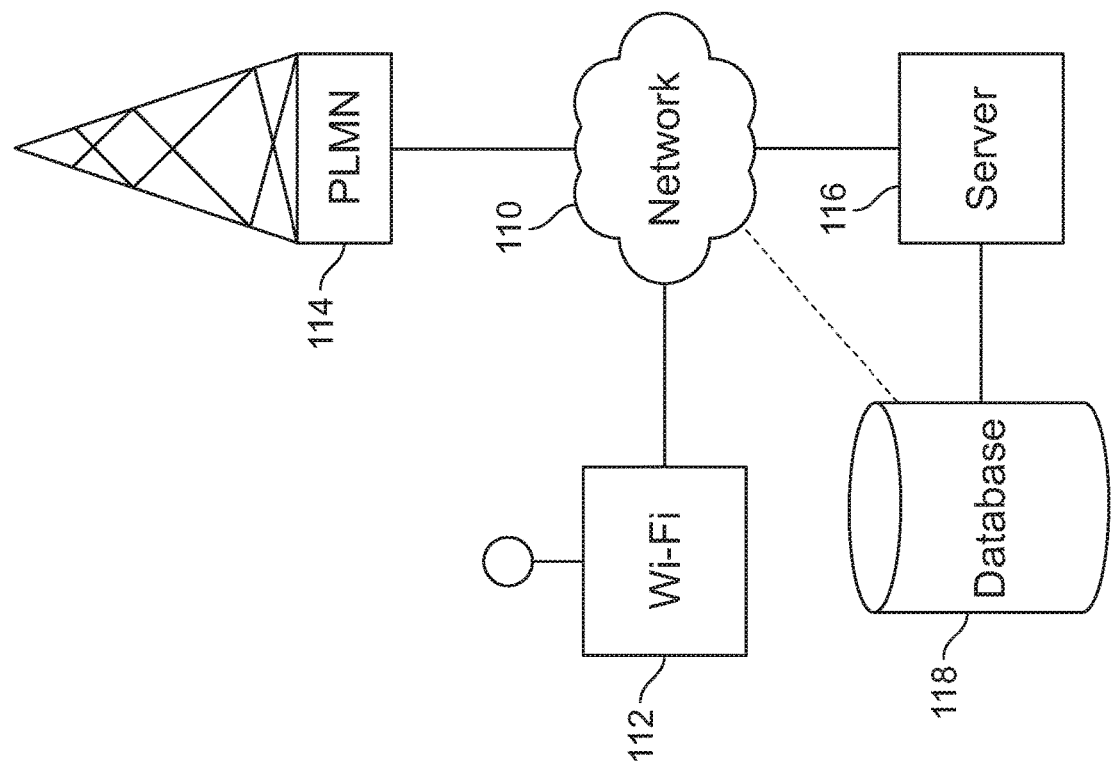
FIG. 1 shows a schematic representation of an autonomous marking system.
Figure 1:
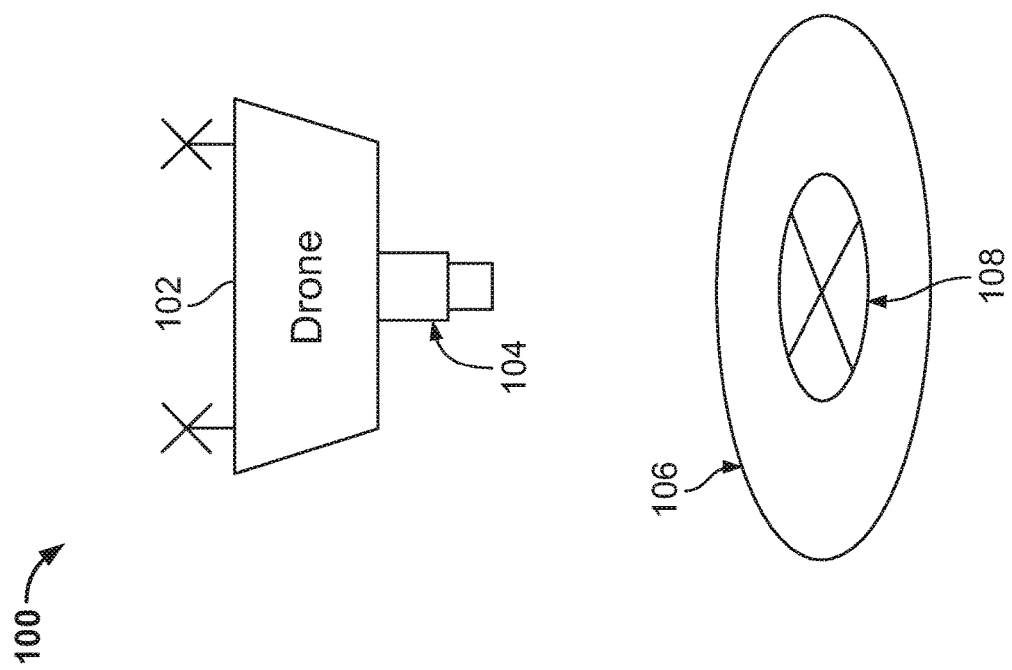

FIG. 1 shows a schematic representation of an autonomous marking system 100 comprising drone 102, network 110, Wi-Fi 112, public land mobile network (PLMN) 114, and server 116. Autonomous marking system 100 may include one or more drones 102, each drone 102 having a particular purpose. For example, one or more drones 102 may include sensors to identify utility lines and/or markings. Further, one or more drones 102 may include an applicator 104 (e.g., a spray nozzle) to mark the utility lines and/or markings identified by the same or another drone 102. Drone 102 is further described in the description of FIG. 2. As shown in FIG. 1, utility lines can be located at location 106 and identified by marking 108. Because utility lines are often several feet below the surface, markings 108 assist developers, utility workers, and homeowners in locating utility lines below the surface.

Network 110 represents a network of internet-based devices and connections such as servers, storage, and applications. Server 116 may be a server and the receiver of input data from drone 102, as well as data structures from network 110. Server 116 may also transmit signals and/or commands to drone 102. In one implementation, server 116 transmits signals to drone 102 to enable operation of applicator 104. Server 116 includes non-volatile storage that can maintain data for long periods of time and may comprise hard disks, optical disks, solid-state drives (SSDs), or another type of non-volatile memory. Server 116 may also include databases with accessible data structures that comprise information corresponding to locations of markings and utility lines. In one implementation, server 116 is communicatively coupled to external database 118 with accessible data structures that comprise information corresponding to locations of markings, types of markings, timestamps of marking creations, marking expiration data/time, and the like that correspond to certain infrastructure, such as utility lines. Server 116 may include a web server configured to receive inputs from entities using a user interface. Server 116 is further described in the description of FIG. 3, below. The database 118 may directly interface with server 116 and/or be included within a datastore of server 116. The database 118 may interface with server 116 and/or another other element of the marking system via data network 110. In some implementations, a portion of the data stored with datastore 118 may be stored within a memory and/or datastore of drone 102.

The communication between network 110 and drone 102 can be achieved using Wi-Fi 112 and/or PLMN 114. Wi-Fi 112 is implemented using a router that connects with drone 102 using a wireless local area network using IEEE 802.11 standards. Wi-Fi 112 may be located on or in a structure (e.g., a house or building) and allows drone 102 to communicate with network 110 within the range of the wireless local area network surrounding the structure. For example, drone 102 can be deployed from the roof of a building to location 106 if location 106 is within the range. In one implementation, Wi-Fi 112 may be located on a mobile structure (e.g., a van or truck) that allows drone 102 to communicate with network 110 within the range of the wireless local area network surrounding the mobile structure. For example, drone 102 can be deployed from a mobile structure that has been deployed near location 106. PLMN 114 is a wireless telecommunication system that allows drone 102 to communicate with network 110 from a larger range compared with Wi-Fi 112. In one aspect, PLMN 114 is implemented using a radio base station and radio transmitters and receivers. As described further below, drone 102 transmits and receives data from Wi-Fi 112 and/r PLMN 114 using an on-board transceiver.

Figure 2:
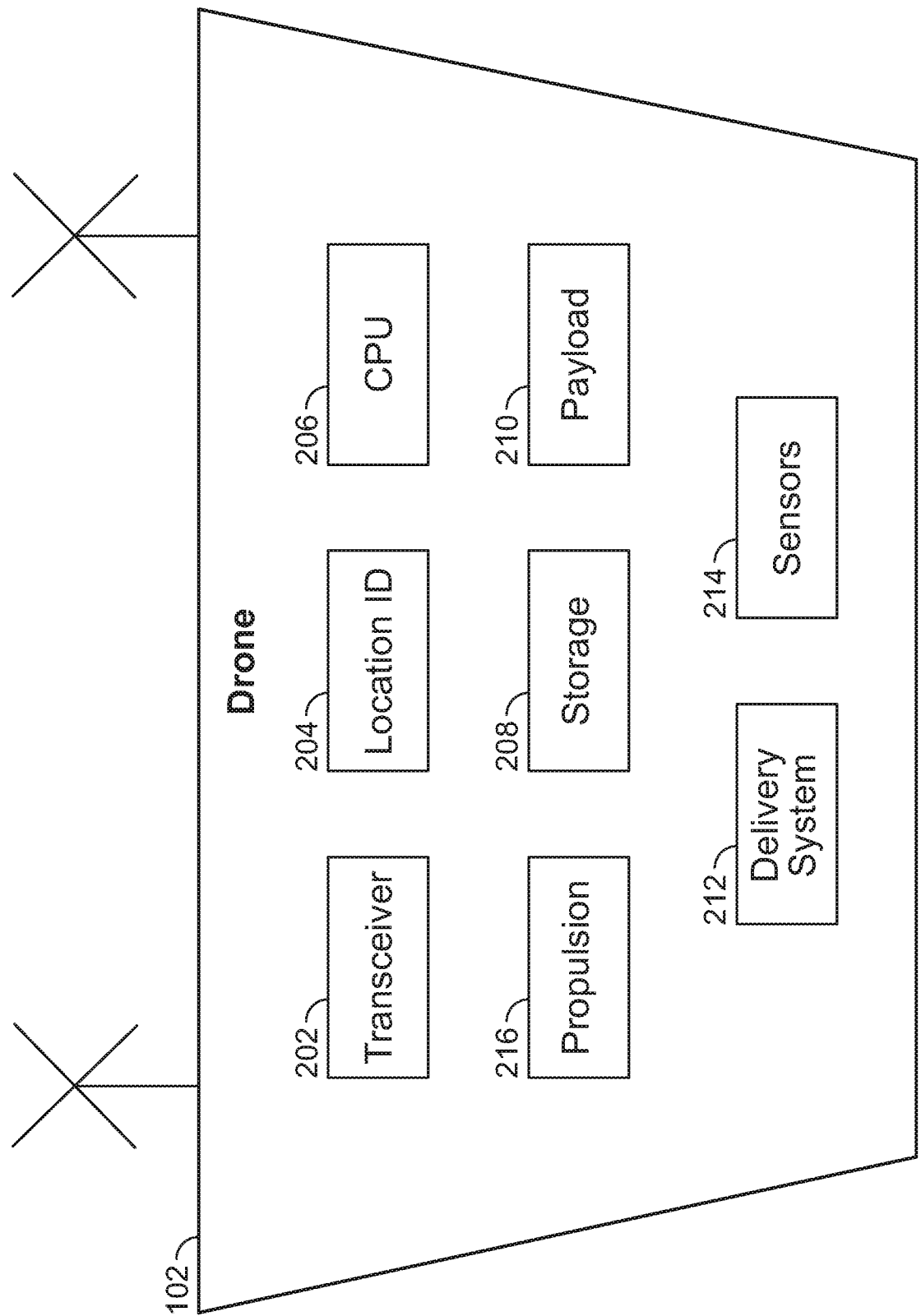
FIG. 2 shows a schematic representation of a drone of the autonomous marking system of FIG. 1.

FIG. 2 shows a schematic representation of a drone 102. Drone 102 comprises transceiver 202, location ID function 204, CPU (central processing unit) 206, storage 208, payload 210, and delivery system 212. Drone 102 may also include a memory unit (e.g., random-access memory), a display, speakers, a user input interface, and an output interface. CPU 206 may include a single microprocessor or multiple microprocessors. Storage 208 may be non-volatile storage that can maintain data for long period of time. Storage 208 may comprise hard disks, optical disks, SSDs, or another type of non-volatile memory.

Transceiver 202 may be a device having a transmitter and a receiver within a single housing or may include circuitry integrated within a server 116 and/or drone 102. Transceiver 202 is capable of transmitting and receiving radio signals. For example, transceiver 202 can transmit and receive data from Wi-Fi 112 and/or PLMN 114. CPU 206 may instruct transceiver 202 to receive data from network 110 and transmit data to network 110 via Wi-Fi 112 and/or PLMN 114. Location ID function 204 represents an identifier system that indicates the location of drone 102. For example, location ID function 204 may include a global positioning system (GPS) circuit or other navigational system using coordinates to keep track of the location of drone 102. Location ID function 204 may also keep track of the address of the nearest structure to use in combination with GPS coordinates. In one aspect, location ID function 204 may also include an accelerometer, telemetry sensor, radio-frequency sensor, and radio-frequency triangulation sensor.

Payload assembly 210 and delivery system 212 and/or applicator 104 enable drone 102 to identify utility markings (e.g., marking 108) and deploy a marking material on the utility markings. Payload assembly 210 may store material that is used to mark utility marking 108. In one aspect, the material in payload 210 includes paint. Typically, utility lines are marked using paint along the length of the lines. The color of the paint identifies the type of utility that is being marked. For example, the American Public Works Association (APWA) has issued a uniform color code for marking underground utility lines. The APWA color code assigned red to electric power lines, yellow to gas lines, orange to communication lines, blue to potable water lines, and green to sewer lines, among others. In one implementation, payload assembly 210 is coupled to applicator 104 such that applicator 104 deploys the material in payload assembly 210 to a marking 108.

Delivery system 212 includes control circuitry to enable deployment of payload assembly 210. For example, CPU 206 may instruct delivery system 212 to open a hatch and/or valve of payload assembly 210, allowing the material of payload assembly 210 to move into applicator 104. Delivery system 212 also includes one or more sensors 214 to identify markings and/or utility lines. The sensors 214 may include one or more of optical sensors, visible light sensors, cameras, infrared sensors, ultra violet sensors, radiation sensors, and/or ground-penetrating sensors. A ground-penetrating sensor may include a sonar, magnetic, and/or electromagnetic sensor. The one or more sensors 214 of delivery system 212 may be configured to scan an area in proximity to the drone 212. For example, the sensors 214 may sense colors and/or compounds in paint. As described above, the color of a marking or a compound in the paint of marking 108 may be used to identify the type of utility line that is underneath marking 108.

In one implementation, sensors 214 may sense colors optically by calculating the hue and saturation of RGB (red, green, and blue) pixels of an image. For example, sensor 214 may capture an image of the area surrounding marking 108. Sensors 214 can calculate the hue and saturation of RGB pixels of the image of the marking 108 and compare the calculations to stored hue and saturation values representing known colors.

In another aspect, sensors 214 may sense colors using infrared spectroscopy to identify pigments in paint. For example, sensor 214 may emit an optical signal having a wavelength in the infrared range and measure the reflectance of light from the paint of marking 108. The reflectance will be different based on the pigment in the paint of marking 108. Sensor 214 can identify the specific pigment by comparing the spectrum of the reflectance with stored spectra of known pigments in paint. Once the pigment has been identified, sensor 214 can determine the color of the paint that corresponds to the identified pigment. Examples of pigments (and their corresponding colors) include carbon (black), cobalt aluminate (blue), chromium oxide (green), titanium dioxide (white), cobalt phosphate (violet), cadmium sulfide (yellow), cadmium sulfoselenide (orange), and iron oxide (red). Other examples of pigments include antimony trioxide (white), zinc oxide (white), cobalt stannate (blue), lead chromate (yellow), zinc chromate (yellow), and cadmium selenide (red).

In yet another aspect, sensors 214 may sense colors using radioluminescence. Radioluminescent paint is a self-luminous paint that consists of a small amount of a radioactive isotope and a radioluminescent phosphor chemical. The radioisotope continually decays, emitting radiation particles which strike molecules of the phosphor, exciting them to emit visible light. Generally, radioluminescent paint uses tritium as the radioactive isotope, but other radioactive isotopes may be used. As discussed above, sensors 214 may include a radiation detector to detect the radiation emitted by the radioactive isotope. In one embodiment, sensors 214 may use RGB optical sensing and/or infrared spectroscopy to identify the color of the radioluminescent paint.

In some implementations, the drone 102 includes a propulsion system 216 that is configured to enable the drone 216 to move from one location to another location. The propulsion system 216 may enable to drone to remain stationary or hover in a particular location. The propulsion system may include one or more propellers, stabilizers, wheels, tracks, thrusters, batteries, and combustible engines. The CPU and/or controller 206 may control the propulsion system 216 to direct the drone 102 to a particular location or locations. The controller 206 may control the propulsion system 216 while concurrently controlling other components of the drone 102. For example, to draw one or more lines and/or markings, the controller may change the position of the drone 102 while actuating the delivery system 212 to delivery marking material, i.e., spray a surface. The controller 206 may also concurrently receive location data from the Location ID function 204 continuously so as to direct the position of the drone 102 along a desired path and/or to a desired location while also marking a target path and/or area.

Figure 3:
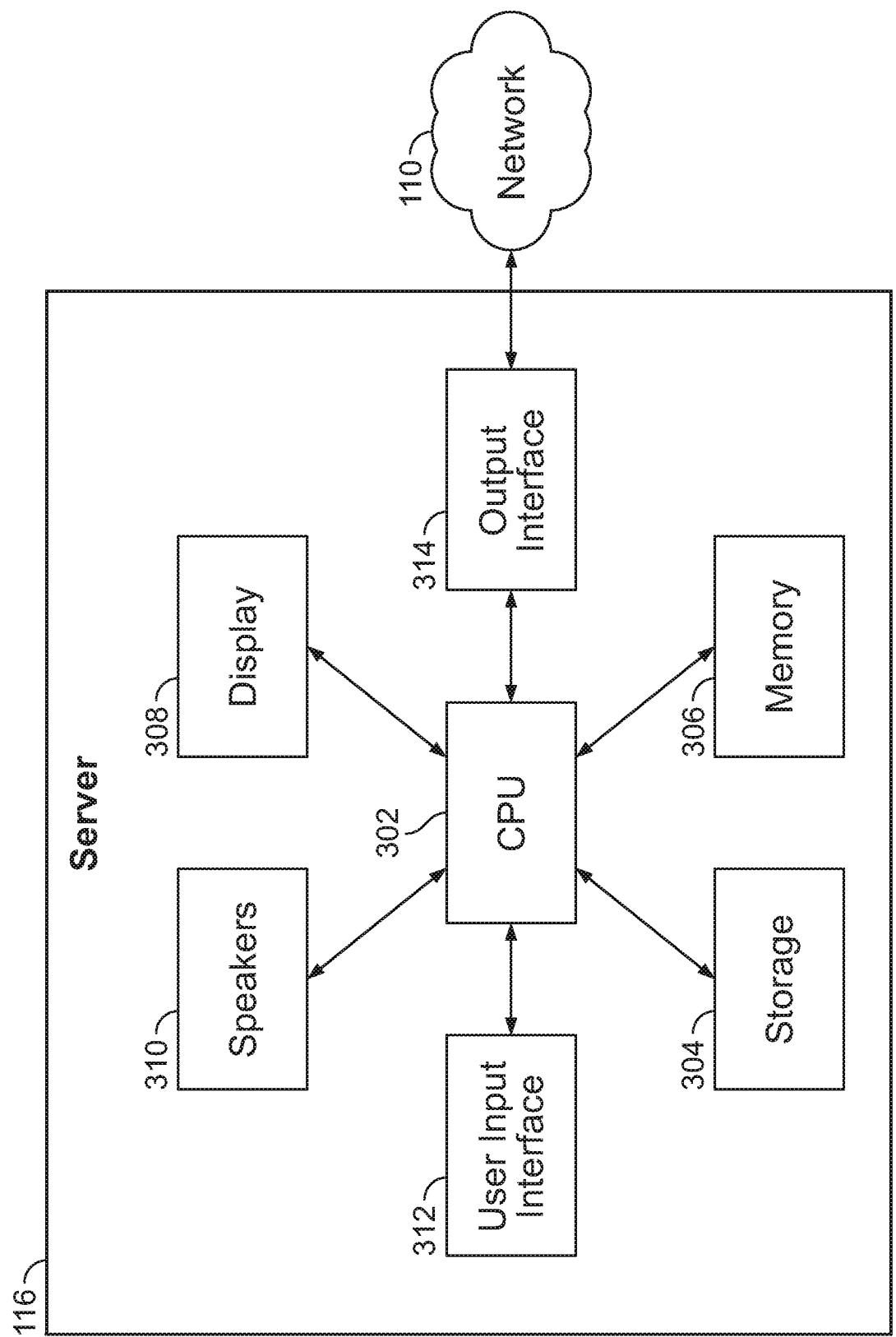
FIG. 3 shows a schematic representation of a server of the autonomous marking system of FIG. 1 interfacing with a network.

FIG. 3 shows a schematic representation of a system 300 including server 116 interfacing with network 110. In one aspect, system 300 also includes a Wi-Fi 112, PLMN 114, other wireless interface, and/or wired interface that interface with network 110. In another aspect, system 300 also comprises database 118 interfacing with server 116. Server 116 comprises CPU 302, storage 304, memory 306, display 308, speakers 310, user input interface 312, and output interface 314. CPU 302 may include a single microprocessor or multiple microprocessors. Storage 304 may be non-volatile storage that can maintain data for long period of time. Storage 304 may comprise hard disks, optical disks, SSDs, or another type of non-volatile memory. Memory 306 may be volatile storage that can be accessed quickly. Memory 306 may comprise dynamic random-access memory (DRAM), static random-access memory (SRAM), or another type of high-speed volatile memory.

Display 308 may be provided as a stand-alone device or integrated with server 116 and may comprise one or more of a monitor, a television, a liquid crystal display (LCD) for a mobile device, or any other suitable equipment for displaying visual images. Speakers 308 may be any suitable equipment for playing audio. User input interface 312 may comprise a keyboard, a mouse, a touch screen display, or any other suitable equipment for user input. Output interface 314 may comprise any suitable data communication device that can interface with network 110. System 300 may include a web client such as, without limitation, Google Chrome, Internet Explorer, and the like. The network 110 may include the Internet, an intranet, private data network, wireless network, mobile data network, satellite network, and the like.

Utility companies deploy contractors to detect and identify the location 106 and depth of the utility lines using a utility locator tool. After detection and identification, the utility lines are marked with a marking (e.g., paint). However, when utility lines need to be marked across a large area (e.g., along a highway), traditional human marking of the utility lines can be onerous. Autonomous marking system 100 facilitates marking of utility lines by deploying drones 102 to identify and mark utility lines at a location 106.

Figure 4:
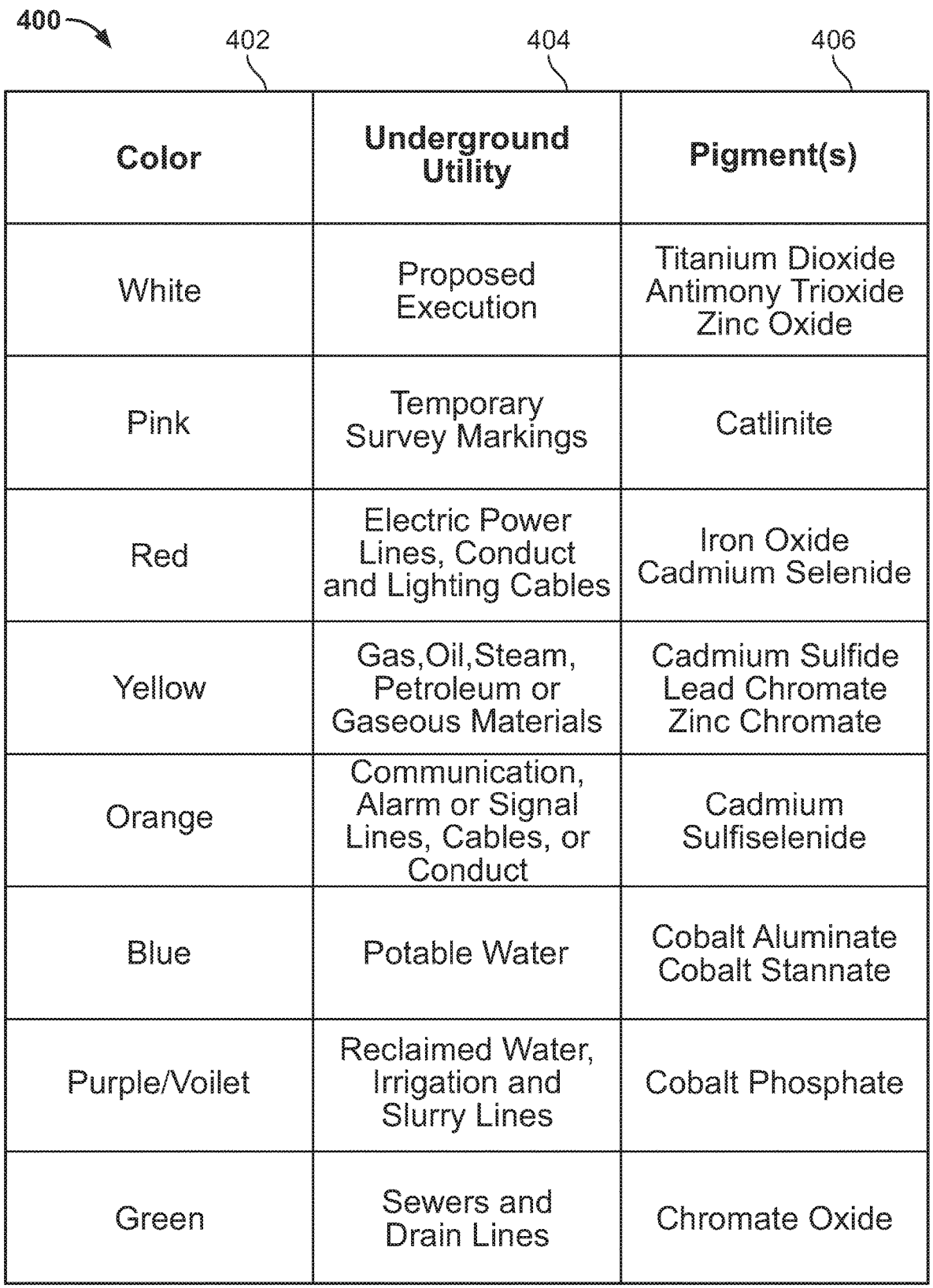
FIG. 4 shows a schematic representation of a uniform color code for marking underground utility lines.

FIG. 4 includes an infrastructure table 400 of a marking database that shows various marking colors in column 402, their corresponding infrastructure descriptions in column 404, and their corresponding unique pigment materials and/or reference indicators in column 406. In some configurations, column 406 lists other types of indicators instead of or in addition to the pigments such as, for example, radioactive or chemically reactive materials. The colors in table 400 may correspond to the American Public Works Association (APWA) established a color code that identifies types of underground utility lines. For example, white represents proposed excavation limits or routes, pink represents temporary survey markings or unknown/unidentified facilities, red represents electric power lines, yellow represents gaseous flammable material, orange represented telecommunication cables, blue represents drinking water, purple represents reclaimed water and irrigation lines, and green represents sewers and drain lines. Other colors may represent other underground utility lines.

FIG. 5 includes a table 500 of a markings database that correlates markings in a marking column 502 with corresponding location data in location column 504, project data project data in column 506, an infrastructure identifier (ID) in column 508, and marking status indicator in column 532. In some implementations, the ID is a unique identifier. The ID may include a type indicator (e.g., "G" for gas or "P" for potable water, and so on). The location identifier, e.g., L1, may include an address, GPS coordinates, coordinates with respect to a reference point, a grid identifier, and the like. The location identifier may include map data including, for example, a two-dimensional (2D) representation showing the location of the underground infrastructure within a particular area. The location identifier may include a three-dimensional (3D) map and/or representation the shows a horizontal geographic area along with a vertical area (i.e., depth). The 3D representation may show the position, path, and/or route of the underground infrastructure through the 3D space delimited by the location identifier, e.g., L1. In some implementations, the location identifier may include a reference point (e.g., GPS coordinates) from which a 2D or 3D space is further delimited.

FIG. 5 shows a table 500 listing multiple underground infrastructure elements. In some implementations, multiple rows 510, 512, 514, and 516 may be associated with a particular infrastructure element such as the gas infrastructure element with an ID of "G001." The G001 gas infrastructure element may be associated with multiple location identifiers L1, L2, L3, and L4. In some configurations, the multiple location identifiers L1, L2, L3, and L4 may be associated with infrastructure element G001 to indicate a beginning and end of an element or a path or route of an element. A project identifier, e.g., P1, may also be associated with an underground infrastructure element (e.g., a gas line). Table 500 may include a status column 532 that indicates a condition and/or status of one or more markings associated with an infrastructure element. For example, infrastructure element G001 has markings at L1 and L2 with a status indicating that the marking are adequate or OK. But, the marking L3 in row 514 has a status of missing ("M"). Also, the marking L4 in row 516 has a status of faded, partial, not sufficiently present, and/or inadequate ("F"). Other status indicators may be assigned to particular infrastructure elements.

Other information or data may be stored and associated with each infrastructure element such as, without limitation, description of element, description of project, operational instructions, regulatory requirements, dimensions of infrastructure elements (e.g., size, diameter, length, and so on), infrastructure element materials (e.g., PVC, aluminum, steel, and so on), time and/or date of installation, time and/or date of expiration of element components, condition of infrastructure element, condition and/or status of infrastructure element markings (i.e., incomplete, faded, incorrect, missing, and so on), handling instructions, data derived from historical infrastructure information, data from historical infrastructure maps, data from regulatory databases, data from utility databases, data from previously detected infrastructure, survey data, and data from real-time detection information. The table 500, or a portion thereof, may be stored in a remote database such as database 118 and/or storage 304 of sever 116. In some implementations, a portion of table 500 is stored in storage 208 of one or more drones 102. A drone 102 may access remote database 118 and/or storage 304 of server 116 via network 110 to access underground infrastructure data including the location and/or type of one or more of infrastructure elements.

A drone 102 may store a subset of the data of table 500 locally in storage 208 so as to conserver memory while only needing underground infrastructure data associated with a particular project, e.g., P1, or a particular location that the drone 102 is currently working. Once the drone 102 completes maintenance and/or repairs of markings at a particular site, project, and/or location P1, the drone 102 may update table 500 with status information (e.g., "OK" or "M" or "F" if the drone was unable to complete repairs). Once table 500 is updated in remote database 118 and/or storage 304, the drone 102 may deleted the portion of table 500 in its local storage 208 associated with project P1. When a drone 102 is assigned to, for example, project P2, the drone 102 may access database 118 and/or storage 304 to obtain underground infrastructure data associated with project P2, and store the P2 data in a local copy of a portion of table 500 in storage 208. An example process for identifying utility markings using autonomous marking system 100 is described below in relation to FIG. 7.

Figure 6:
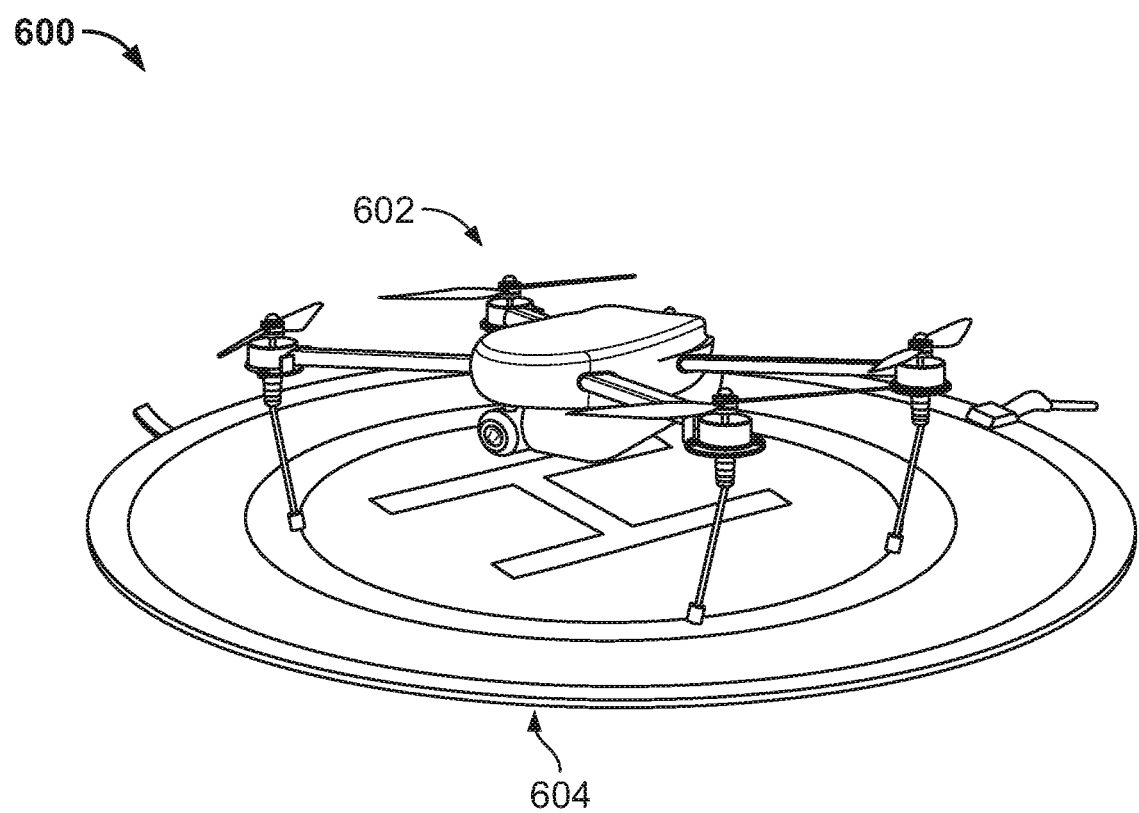
FIG. 6 shows another drone of the autonomous marking system of FIG. 1.

FIG. 6 illustrates another autonomous system 600 including a drone 602 and/or 102 on a landing pad 604 that can be used to assist human marking of utility lines. The landing pad 604 may be located on a utility vehicle, regional office building, parking lot, or other surface in sufficient proximity to a project, site, and/or location where the drone 602 and/or 102 is to working on underground infrastructure markings.

Figure 7:
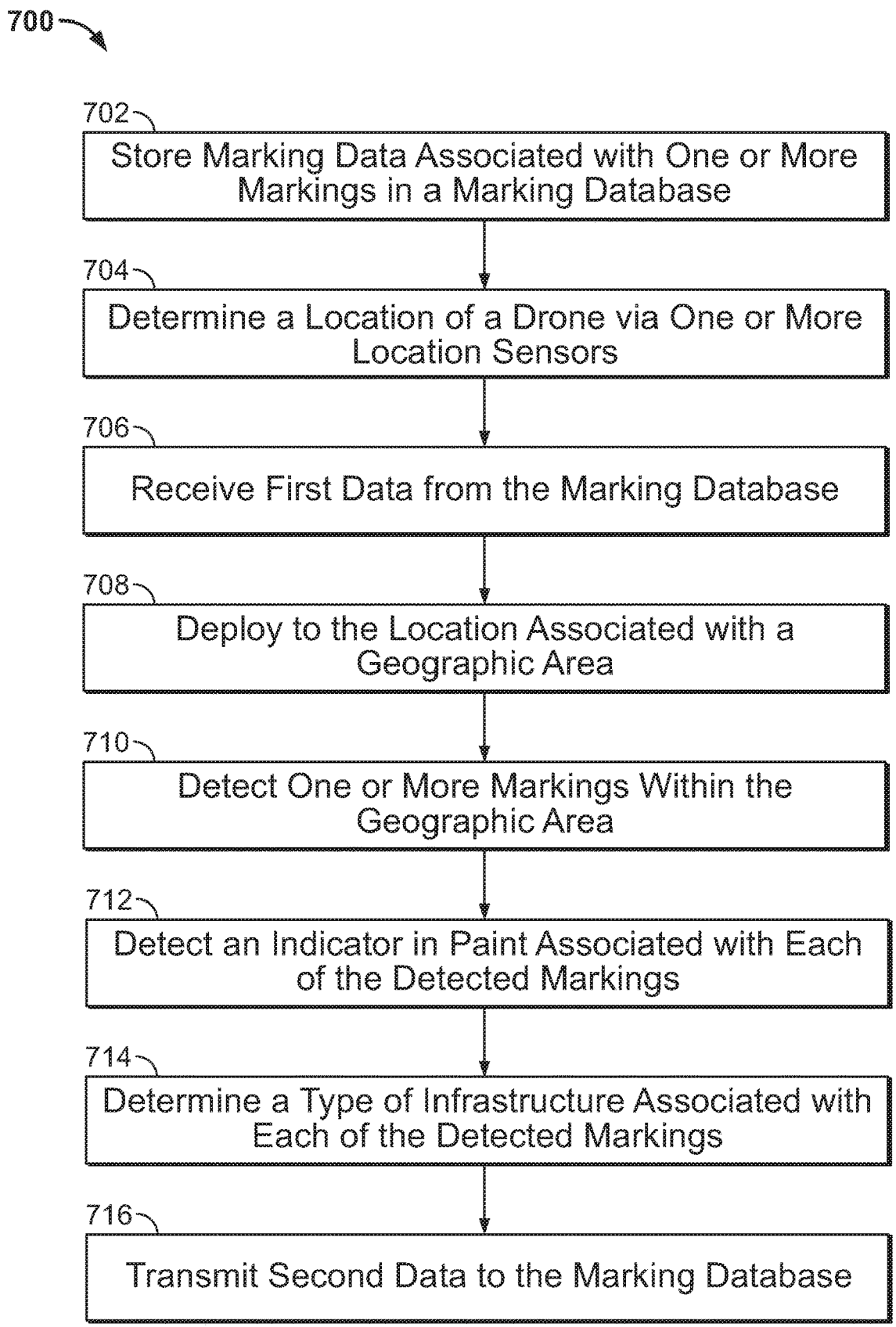
FIG. 7 is a flow diagram of method steps for identifying markings using the autonomous marking system of FIG. 1.
Figure 8:
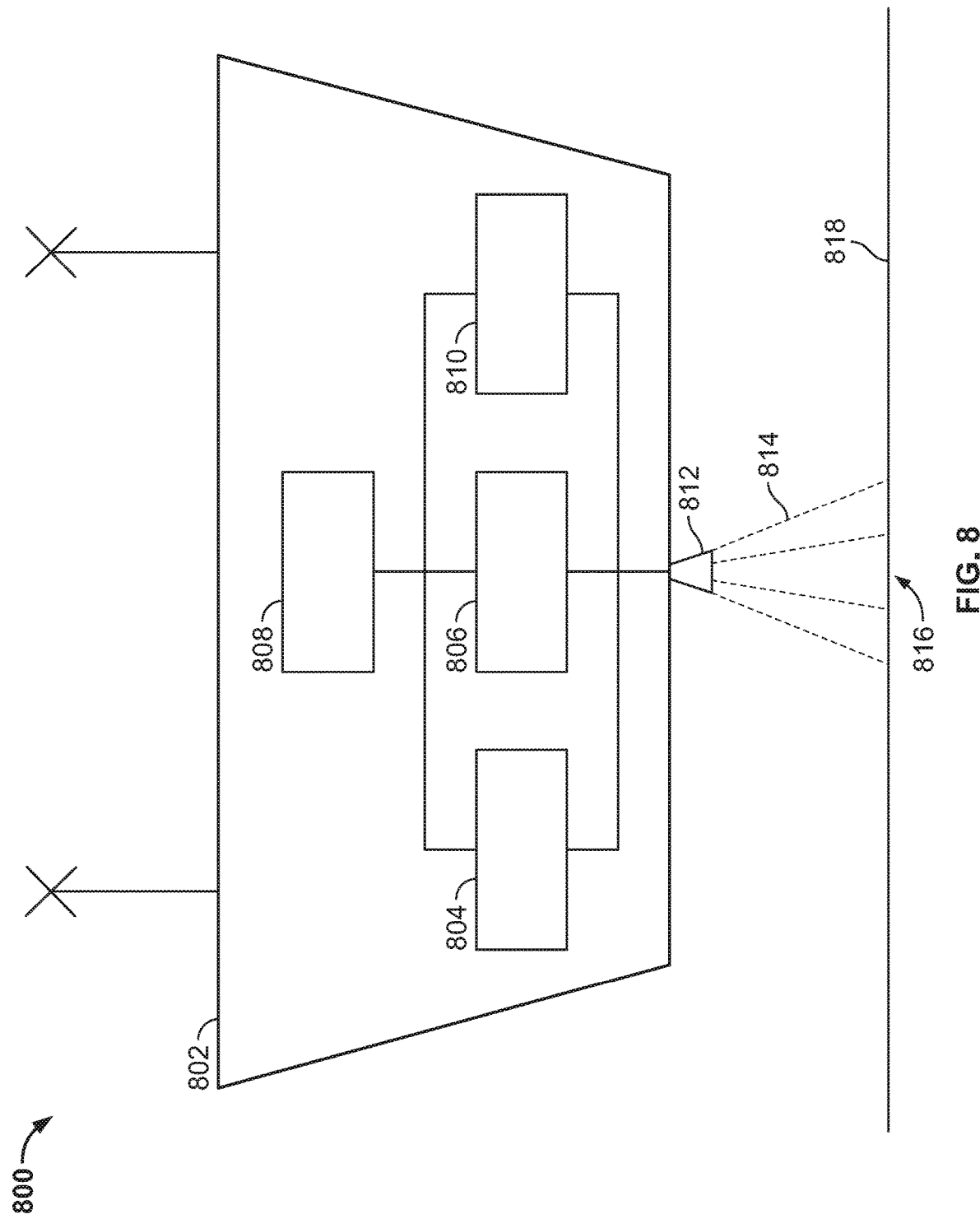
FIG. 8 illustrates a drone spraying a target area with marking material.
Figure 9:
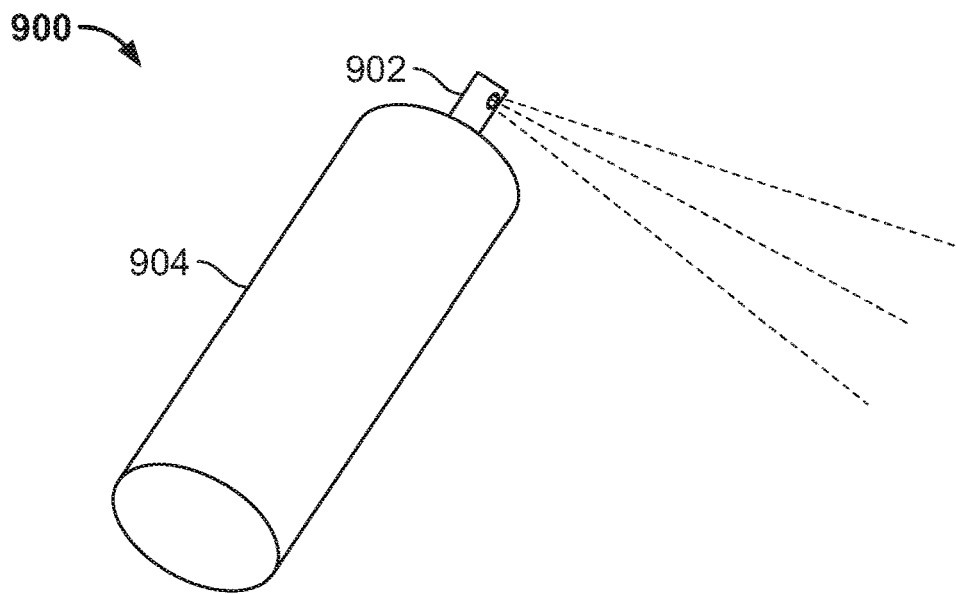
FIG. 9 shows a perspective view of an aerosol can including marking material.
Figure 10:
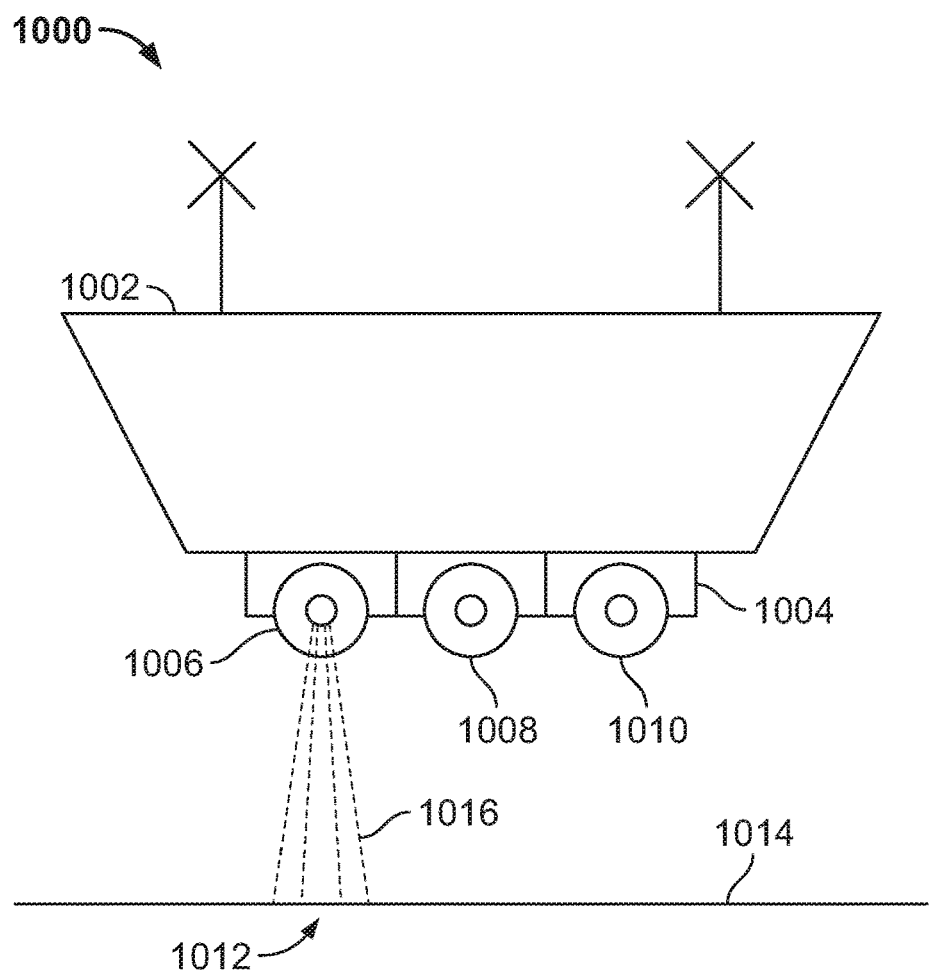
FIG. 10 illustrates a drone deploying a marking to a target area while holding multiple detachably connectable aerosol cans.

FIG. 7 shows a process 700 of method steps for identifying utility markings using autonomous marking system 100 is illustrated in FIG. 1. The process 700 begins by storing marking data associated with one or more markings 108 in a marking database 118. (Step 702). The marking data may include one or more marking locations within a geographic area 106 and a type of infrastructure associated with each of the one or more markings 108. For example, marking database 118 can store underground infrastructure data that can be used by drone 102 to identify markings 108. The location data may include the GPS coordinates of location 106. Location 106 may be associated with an underground infrastructure such as a water pipe, a gas pipe, an electrical cable, a fiber optic cable, a communication cable, a liquid pipe, a structure, a tunnel, an electrical unit, or an electronics unit.

Process 700 continues by determining a location of a drone 102 via one or more location sensors. (Step 704). The apparatus may be a robot, a drone 102, unmanned aerial vehicle (UAV), or autonomous aerial vehicle (AAV). For example, location ID function 204 of drone 102 can determine the location 106 of drone 102. Location ID function 204 may include a GPS system using coordinates to keep track of the location of drone 102. Location ID function 204 may also keep track of the address of the nearest structure to use in combination with the GPS coordinates. In one aspect, location ID function 204 may also include an accelerometer, telemetry sensor, radio-frequency sensor, and radio-frequency triangulation sensor.

Process 700 continues by receiving first data from the marking database 118. (Step 706). The first data may include a location associated with the geographic area 106. For example, transceiver 202 of drone 102 can exchange data with server 116 via network 110. The data network can be a wireless data network such as a mobile telephone network, a Wi-Fi network, local area network, wide area network, the Internet, a Bluetooth network, and other wireless network. The mobile telephone network can be implemented using PLMN 114. The Wi-Fi network and/or local area network can be implemented using Wi-Fi 112.

Process 700 continues by deploying to the location associated within the geographic area 106. (Step 708) and detecting one or more markings within the geographic area using one or more marker sensors (Step 710). For example, delivery system 212 can include marking sensors configured to scan an area at location 106. The marking sensors 218 may include optical sensors, visible light sensors, cameras, infrared sensors, ultraviolet sensors, and/or radiation sensors. The marking material of the markings 108 may include paint, flags, electronic beacons, and/or marking structures. The marking material may include optically-identifiably elements. For example, the paint in payload 210 may include a pigment or compound that is identifiable by a sensor of drone 102. As discussed above in relation to FIG. 2, examples of pigments (and their corresponding colors) include carbon (black), cobalt aluminate (blue), chromium oxide (green), titanium dioxide (white), cobalt phosphate (violet), cadmium sulfide (yellow), cadmium sulfoselenide (orange), and iron oxide (red). Other examples of pigments include antimony trioxide (white), zinc oxide (white), cobalt stannate (blue), lead chromate (yellow), zinc chromate (yellow), and cadmium selenide (red). In one aspect, the paint includes a radioactive isotope such as tritium.

Process 700 continues by detecting an indicator in paint associated with each of the detected markings. (Step 712). For example, sensor 214 may emit an optical signal having a wavelength in the infrared range and measure the reflectance of light from the paint of marking 108. The reflectance will be different based on the pigment in the paint of marking 108. Sensor 214 can identify the specific pigment by comparing the spectrum of the reflectance with stored spectra of known pigments in paint. Once the pigment has been identified, sensor 214 can determine the color of the paint that corresponds to the identified pigment. In one aspect, sensor 214 may capture an image of the area surrounding marking 108. Sensors 214 may calculate the hue and saturation of RGB pixels of the image of the marking 108 and compare the calculations to stored hue and saturation values representing known colors.

Process 700 continues by determining a type of infrastructure associated with each of the detected markings. (Step 714). For example, drone 102 can determine the type of infrastructure associated with each of the detected markings 108 using table 400. As shown in FIG. 4, table 400 illustrates the color code. For example, white represents proposed excavation limits or routes, pink represents temporary survey markings or unknown/unidentified facilities, red represents electric power lines, yellow represents gaseous flammable material, orange represented telecommunication cables, blue represents drinking water, purple represents reclaimed water and irrigation lines, and green represents sewers and drain lines. Other colors may represent other underground utility lines.

In one aspect, transceiver 202 of drone 102 can exchange data with a ground-penetrating sensor. Ground-penetrating sensors may be used to detect and identify the location 106 and depth of the utility lines. The ground-penetrating sensor may collect underground infrastructure data that can be used by drone 102 to identify markings 108.

Process 700 then transmits second data to the marking database 118. (Step 716). The second data can include the type of infrastructure associated with each of the detected markings 108 and a marking location 106 associated with each of the detected markings 108. For example, transceiver 202 of drone 102 may exchange data with server 116 via network 110. Server 116 can then store the second data in marking database 118.

In one aspect, CPU 206 of drone 102 can be configured to receive data from location ID 204, delivery system 212, and transceiver 202. CPU 206 can use the received data to control the delivery of the payload 210 at location 106. For example, CPU 206 may instruct delivery system 212 to open an access to payload 210, allowing a portion of the material of payload 210 to move into applicator 104, if drone 102 is in a position above marking 108. In some aspects, the delivery system 212 includes spray nozzles, spread head, pneumatic dispensers, mechanical dispensers, and/or electronic dispensers.

In one aspect, the marking database 118 is located remotely from drone 102 and drone 102 receives first data from and send second data to the marking database 118 via a remote server. Drone 102 may send data to the marking database 118 at least one of periodically, in real-time, in near real-time, and in response to a query from the remote server. In another aspect, the marking database 118 is located in drone 102, at a drone-deploying vehicle, in a remote regional location, or at a headquarters location.

In another aspect, drone 102 performs detection of the one or more markings 108 in response to an instruction from a user. For example, the instruction from the user may be via a wireless device communicatively coupled to the data network. Drone 102 may be configured to remain within proximity of the user.

In one aspect, the CPU 206 of drone 102 is configured to process the underground infrastructure data received from the ground-penetrating sensor and location data received from location ID 204 and store a table including correlated underground infrastructure and location data in storage 208. In another aspect, CPU 206 may transmit the table to server 116 via network 110. The server 116 may store the table in database 118 for future use by another drone 102. In some instances, a drone 102 may survey an area using an underground infrastructure sensor and/or ground-penetrating sensor to determine the location and/or depth of underground infrastructure, and apply one or more markings to the surface above such infrastructure via, for example, applicator 104. In other instances, a drone 102 may survey the surface of an area to confirm and/or identify the location of certain underground infrastructure using, for example, sensors 208 to detect existing markings. In yet other instances, a drone 102 may scan for marking and scan for underground infrastructure concurrently. In a further instance, a drone 102 may be directed to particular location by, for example, server 116, sending location data and instructions to the drone 102 to deliver a particular type of payload (e.g., yellow paint associated with a gas line) at that location. Once the payload is delivered, the drone 102 may send data back to server 116 indicating completion of the payload delivery so that a status associated with the underground infrastructure is updated in a marking database. In some configurations, the underground infrastructure scanner may be detached from and/or not connected to the drone 102 but communicatively coupled to the drone 102 via a wireless interface to enable detection, location, and/or depth data to be delivered to the drone 102.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A marking identification system comprising:
a marking database arranged to store marking data associated with one or more underground infrastructure markings arranged to identify the location of one or more underground infrastructure elements, the marking data including one or more underground infrastructure marking locations within a geographic area and including a type of infrastructure associated with each of the one or more underground infrastructure markings, the marking database including an infrastructure type table correlating each color of a set of colors to a different type of infrastructure, the marking database communicatively coupled to a data network; and
a drone communicatively coupled to the data network, wherein the drone is configured to:
  determine the location of the drone via one or more location sensors;
  receive first data from the marking database, wherein the first data includes a location associated with the geographic area;
  deploy to the location associated within the geographic area;
  detect the one or more underground infrastructure markings arranged to identify the location of one or more underground infrastructure elements within the geographic area using one or more marker sensors;
  detect an indicator in paint associated with each of the detected underground infrastructure markings;
  determine a type of infrastructure associated with each of the detected underground infrastructure markings based on the detected indicator associated with each of the underground infrastructure markings, wherein each of the detected indicators includes a color of the set of colors listed in the infrastructure type table that corresponds to the type of infrastructure; and
  transmit second data to the marking database, wherein the second data includes the type of infrastructure associated with each of the detected underground infrastructure markings and a marking location associated with each of the detected underground infrastructure markings;
wherein the one or more underground infrastructure markings are located on a ground surface above the one or more infrastructure elements.

2. The system of claim 1, wherein the drone includes a data store that stores a portion of the marking database.

3. The system of claim 2, wherein: the marking database is located remotely from the drone, and the drone is configured to receive the first data from and send the second data to the marking database via a remotes server.

4. The system of claim 3, wherein the drone is configured to send the second send data to the marking database at least one of periodically, in real-time, in near real-time, and in response to a query from the remote server.

5. The system of claim 1, wherein the indicator includes at least one of a pigment, a radioactive material, light sensitive material, and a chemically reactive material.

6. The system of claim 1, wherein the marking database includes an infrastructure table correlating each reference indicator with a type of infrastructure.

7. The system of claim 6, wherein the drone is configured to determine the type of infrastructure associated with a detected marking by comparing the detected indicator with the infrastructure table to identify a match between a reference indicator and the detected indicator.

8. The system of claim 1, wherein the drone is unmanned aerial vehicle (UAV) or autonomous aerial vehicle (AAV).

9. The system of claim 1, wherein the marking database is located at least one of in the drone, at a drone-deploying vehicle, in a remote regional location, and at a headquarters location.

10. The system of claim 1, wherein the drone is configured to perform detection of the one or more underground infrastructure markings in response to an instruction from a user.

11. The system of claim 10, wherein the instruction from a user may be via a wireless device communicatively coupled to the data network.

12. The system of claim 11, wherein the drone is configured to remain within proximity of the user.

13. The system of claim 1, wherein the marking data includes data derived from at least one of historical underground infrastructure information, historical infrastructure maps, regulatory databases, utility databases, previously detected infrastructure, survey data, and real-time detection information.

14. The system of claim 1, wherein the data network includes at least one of a mobile telephone network, a Wi-Fi network, local area network, wide area network, the Internet, a Bluetooth network, and other wireless network.

15. The system of claim 1, wherein the one or more marking sensors include one or more of optical sensors, visible light sensors, cameras, infrared sensors, ultra violet sensors, and radiation sensors.

16. The system of claim 1, wherein the type of infrastructure comprises a type of utility.

17. The system of claim 1, wherein the type of infrastructure is determined based on at least one of a visual, hyperspectral, and radio characteristic of the detected underground infrastructure markings.

18. A autonomous marking identification apparatus comprising:
a transceiver communicatively coupled to a data network, the transceiver arranged to receive first data from a marking database, wherein the first data includes marking data associated with a portion of a geographic area, the marking database being arranged to store marking data associated with one or more underground infrastructure markings arranged to identify the location of one or more underground infrastructure elements, the marking data including one or more marking locations within the geographic area and including a type of infrastructure associated with each of the one or more markings, the marking database including an infrastructure type table correlating each color of a set of colors to a different type of infrastructure;
a location sensor arranged to determine a location of the apparatus;
a propulsion system arranged to enable the apparatus to deploy to each marking location within the portion of the geographic area;
one or more marking sensors arranged to scan an area in proximity to the apparatus; and a processor arranged to
i) coordinate with the one or more marking sensors to detect the one or more underground infrastructure markings arranged to identify the location of one or more underground infrastructure elements within the geographic area;
ii) detect an indicator in paint associated with each of the detected underground infrastructure markings;

iii) determine a type of infrastructure associated with each of the detected underground infrastructure markings based on the detected indicator associated with each of the underground infrastructure markings, wherein each of the detected indicators includes a color of the set of colors listed in the infrastructure type table that corresponds to the type of infrastructure; and iv) coordinate with the transceiver to transmit second data to the marking database, wherein the second data includes the type of infrastructure associated with each of the detected underground infrastructure markings and a marking location associated with each of the detected underground infrastructure markings;

wherein the one or more underground infrastructure markings are located on a ground surface above the one or more infrastructure elements.

19. The apparatus of claim 18, wherein the indicator includes at least one of a pigment, a radioactive material, light sensitive material, and a chemically reactive material.

20. The apparatus of claim 18, wherein the marking database includes an infrastructure table correlating each reference indicator with a type of infrastructure.

21. The apparatus of claim 20, wherein the apparatus is configured to determine the type of infrastructure associated with a detected underground infrastructure marking by comparing the detected indicator with the infrastructure table to identify a match between a reference indicator and the detected indicator.

22. A method of identifying underground infrastructure markings comprising:

providing a marking database arranged to store marking data associated with one or more underground infrastructure markings arranged to identify the location of one or more underground infrastructure elements, the marking data including one or more marking locations within a geographic area and including a type of infrastructure associated with each of the one or more markings, the marking database including an infrastructure type table correlating each color of a set of colors to a different type of infrastructure;

communicatively coupling a marking database to a data network;

communicatively coupling a drone to the data network;

determining a location of the drone via one or more location sensors;

receiving first data from the marking database, wherein the first data includes marking data associated with a portion of the geographic area;

deploying the drone to each marking location within the portion of the geographic area;

detecting the one or more underground infrastructure markings arranged to identify the location of one or more underground infrastructure elements within the geographic area using one or more marker sensors;

detecting an indicator in paint associated with each of the detected underground infrastructure markings;

determining, by the drone, a type of infrastructure associated with each of the detected underground infrastructure markings based on the detected indicator associated with each of the underground infrastructure markings, wherein each of the detected indicators includes a color of the set of colors listed in the infrastructure type table that corresponds to the type of infrastructure; and transmitting, from the drone, second data to the marking database, wherein the second data includes the type of infrastructure associated with each of the detected underground infrastructure markings and a marking location associated with each of the detected markings;

wherein the one or more underground infrastructure markings are located on a ground surface above the one or more infrastructure elements.

* * * * *